United States Patent Office 3,122,546
Patented Feb. 25, 1964

3,122,546
4,7-DIAMINO-2-(SUBSTITUTED)-N-SUBSTITUTED-6-PTERIDINECARBOXAMIDES
Thomas S. Osdene, West Chester, Pa., assignor to American Home Products Corporation, New York, N.Y., a corporation of Delaware
No Drawing. Filed Dec. 3, 1962, Ser. No. 241,523
2 Claims. (Cl. 260—251.5)

This invention relates to novel pteridine compounds having significant antiviral properties. More specifically, the invention is concerned with 4,7-diamino-2-(substituted)-N-substituted-6-pteridinecarboxamides having the formula:

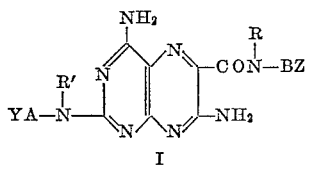

wherein Y and Z may be the same or different and are selected from the group consisting of di-lower alkyl amino radicals in which the alkyl radicals may be the same or different and may have from 1 to 4 carbon atoms in the chain, morpholinyl, pyrrolidinyl, piperazinyl and piperidinyl radicals; R and R' may be the same or different and are selected from the group consisting of hydrogen and lower alkyl having from 1 to 4 carbon atoms in the chain; A and B may be the same or different and are straight chained or branch alkylene radicals having from 2 to 5 carbon atoms.

The compounds sought to be patented, suitably, are prepared from the corresponding 2-alkylthio-4,7-diamino-N-(substituted)-6-pteridinecarboxamides, which are disclosed and claimed in co-pending application Serial No. 241,487, filed December 3, 1962. To prepare the compounds of this invention, a 2-alkylthio-4,7-diamino-N-(substituted)-6-pteridinecarboxamide, II, and a primary or secondary amine, III, are refluxed together until the evolution of mercaptan ceases. At this point, the resulting solution is diluted with ethanol and is filtered. The filtrate is concentrated and the residue is repeatedly extracted with ether. Cooling the ether extracts precipitates the product which can be purified by recrystallization from benzene.

The reaction may be represented schematically as follows:

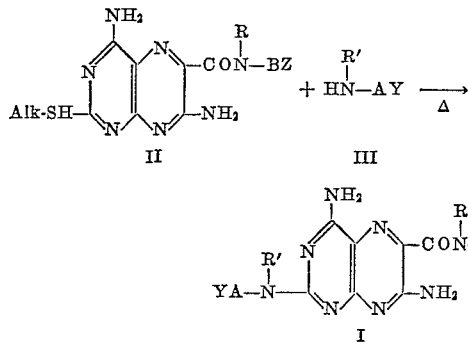

wherein the substituents are as above stated.

The following examples represent the best mode of carrying out the invention.

*Example 1*

A mixture of 3.64 g. of 4,7-diamino-N-(3-diethylaminopropyl)-2-methylmercapto-6-pteridinecarboxamide and 25 ml. of 3-diethylaminopropylamine were boiled together under an air condenser for 20 hours. No further evolution of methyl mercaptan was noted and the dark solution was diluted with ethanol and filtered. The solution was concentrated and the remaining brown liquid was taken up in ether. On scratching, a dark material was deposited and the ether layer was decanted. Further dark material was obtained on scratching and on decanting the ether layer again, a yellow precipitate was obtained on cooling. Recrystallization from benzene yielded 4,7-diamino-2-(3-diethylaminopropylamino) - N - (3 - diethylaminopropyl)-6-pteridinecarboxamide monohydrate, M.P. 119° C.

*Analysis.*—Calculated: C=54.28, H=8.68, N=30.15. Found: C=54.39, H=8.25, N=29.83.

When applying the above procedure to the starting compounds listed below, there are obtained the corresponding products enumerated below:

| Starting Compounds | Products |
|---|---|
| 4,7-diamino-N-(2-dimethyl-aminoethyl)-2-methylmercapto-6-pteridinecarboxamide and 2-morpholinoethylamine. | 4,7-diamino-N-(2-dimethyl-aminoethyl)-2-(2-morpholino-ethyl-amino)-6-pteridinecarboxamide. |
| 4,7-diamino-N-methyl-N-(5-pyrrolidinopentyl)-2-propylmercapto-6-pteridinecarboxamide and 2-pyrrolidinoethylamine. | 4,7-diamino-N-methyl-N-(5-pyrrolidinopentyl)-2-(2-pyrrolidino-ethyl-amino)-6-pteridinecarboxamide. |
| 4,7-diamino-N-butyl-N-(2-piperidinoethyl)-2-methylmercapto-6-pteridinecarboxamide and N-butyl-5-piperidinopentylamine. | 4,7-diamino-N-butyl-N-(2-piperidinoethyl)-2-(N-butyl-5-piperidinopentylamino)-6-pteridinecarboxamide. |
| 4,7-diamino-N-(2-diisopropylami-noethyl)-2-methylmercapto-6-pteridinecarboxamide and N-methyl-2-diethylaminoethyl-amine. | 4,7-diamino-N-(2-diisopropylami-noethyl)-2-(N-methyl-2-diethyl-aminoethylamino)-6-pteridinecarboxamide. |
| 4,7-diamino-N-(2-morpholino-ethyl)-2-methylmercapto-6-pteridinecarboxamide and 5-piperidinopentylamine. | 4,7-diamino-2-(5-piperidinopentyl-amino)-N-(2-morpholinoethyl)-6-pteridinecarboxamide. |

The subject compounds are useful in experimental pharmacology and are effective against SKF Polio and Semliki Forest viral organisms.

The compounds of this invention can be administered in a wide variety of oral or parenteral unit dosage forms singly, or in admixture with other active compounds.

The present invention also includes the process of bringing the compounds thereof into a form suitable for therapeutic administration by associating them with liquid or solid pharmaceutical carriers.

Various changes and modifications of this invention can be made by those skilled in the art to which it relates and to the extent that such variations incorporate the spirit of the invention, they are included in the scope of the claims.

What is claimed is:
1. A compound of the formula:

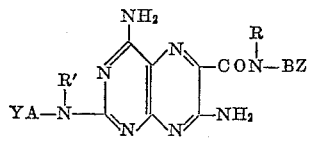

wherein Y and Z are selected from the group consisting of di-lower alkyl amino, morpholino, pyrrolidino and piperidino; R and R' are selected from the group consisting of hydrogen and lower alkyl; and A and B are unsubstituted alkylene radicals having from 2 to 5 carbon atoms.

2. 4,7-diamino-2-(3-diethylaminopropylamino)-N - (3-diethylaminopropyl)-6-pteridinecarboxamide.

References Cited in the file of this patent
UNITED STATES PATENTS
3,028,387    Weinstock _____ Apr. 3, 1962